US009749621B2

(12) United States Patent
Lin et al.

(10) Patent No.: US 9,749,621 B2
(45) Date of Patent: Aug. 29, 2017

(54) CALIBRATION PLATE FOR CALIBRATING A PLURALITY OF IMAGE CAPTURING DEVICES AND METHOD FOR CALIBRATING A PLURALITY OF IMAGE CAPTURING DEVICES

(71) Applicant: METAL INDUSTRIES RESEARCH & DEVELOPMENT CENTRE, Kaohsiung (TW)

(72) Inventors: Shi-Wei Lin, Kaohsiung (TW); Chih-Chin Wen, Hsinchu (TW); Kuo-Kai Hung, Tainan (TW); Chia-Chu Huang, Kaohsiung (TW); Hao-Jhen Chang, Kaohsiung (TW)

(73) Assignee: METAL INDUSTRIES RESEARCH & DEVELOPMENT CENTRE, Kaohsiung (TW)

( * ) Notice: Subject to any disclaimer, the term of this patent is extended or adjusted under 35 U.S.C. 154(b) by 421 days.

(21) Appl. No.: 14/095,062

(22) Filed: Dec. 3, 2013

(65) Prior Publication Data
US 2014/0184815 A1 Jul. 3, 2014

(30) Foreign Application Priority Data
Dec. 27, 2012 (TW) .............................. 101150501 A

(51) Int. Cl.
H04N 17/00 (2006.01)
H04N 17/02 (2006.01)

(52) U.S. Cl.
CPC .................................. *H04N 17/002* (2013.01)

(58) Field of Classification Search
USPC ....... 348/188, 187, 181, 180, 175, 159, 135, 348/129, 46, 47, 48, 49, 50, 92; 356/237.6, 243.1, 384, 387, 388, 398, 356/400, 401, 392, 393, 394
See application file for complete search history.

(56) References Cited

U.S. PATENT DOCUMENTS

| 5,978,081 | A | 11/1999 | Michael et al. | |
|---|---|---|---|---|
| 6,301,396 | B1 | 10/2001 | Michael et al. | |
| 7,808,525 | B2* | 10/2010 | Katayama | G01C 11/02 348/175 |
| 8,451,334 | B2* | 5/2013 | Shishido | G02B 27/32 348/129 |
| 8,610,777 | B2* | 12/2013 | Bengtsson | G01J 3/52 348/187 |

(Continued)

FOREIGN PATENT DOCUMENTS

TW 201018882 5/2010

*Primary Examiner* — Jefferey F Harold
*Assistant Examiner* — Mustafizur Rahman
(74) *Attorney, Agent, or Firm* — WPAT, PC

(57) ABSTRACT

A calibration plate and a method for calibrating image capturing devices are provided. The calibration plate includes: a plate having a front face and a rear face; a plurality of calibration patterns formed at the front face of the plate, arranged in a regular manner, and used to calibrate image distortions, lens aberrations, and image center positions for the image capturing devices; and a plurality of graphically encoded patterns formed at the front face of the plate, the graphically encoded patterns being different from each other, and the graphically encoded patterns having information providing the positions of the calibration patterns.

14 Claims, 8 Drawing Sheets

(56) References Cited

U.S. PATENT DOCUMENTS

| | | | | |
|---|---|---|---|---|
| 8,619,144 B1* | 12/2013 | Chang | H04N 17/002 | 348/180 |
| 8,872,911 B1* | 10/2014 | Wallack | H04N 7/183 | 348/92 |
| 9,230,326 B1* | 1/2016 | Liu | G06T 7/0018 | |
| 2002/0034324 A1* | 3/2002 | Beaty | G06T 7/0002 | 382/145 |
| 2002/0041383 A1* | 4/2002 | Lewis, Jr. | H04N 5/217 | 358/1.9 |
| 2004/0085451 A1* | 5/2004 | Chang | G06T 15/10 | 348/159 |
| 2006/0152589 A1* | 7/2006 | Morrison | G06K 9/209 | 348/208.1 |
| 2006/0181610 A1* | 8/2006 | Carlsson | H04N 5/23238 | 348/159 |
| 2007/0229665 A1* | 10/2007 | Tobiason | H04N 5/3572 | 348/187 |
| 2010/0020180 A1* | 1/2010 | Hill | H04N 5/2253 | 348/188 |
| 2010/0066838 A1* | 3/2010 | Steckhan | G06T 7/0018 | 348/187 |
| 2010/0201809 A1* | 8/2010 | Oyama | G01C 3/14 | 348/135 |
| 2010/0290089 A1* | 11/2010 | Stevens | H04N 1/40062 | 358/3.06 |
| 2011/0001973 A1* | 1/2011 | Polidor | G01B 9/08 | 356/393 |
| 2011/0157373 A1* | 6/2011 | Ye | G06T 7/002 | 348/187 |
| 2012/0229843 A1* | 9/2012 | Golle | H04N 1/00244 | 358/1.15 |
| 2012/0307113 A1* | 12/2012 | Peles | H04N 5/262 | 348/239 |
| 2012/0314062 A1* | 12/2012 | Hawman | G06T 11/005 | 348/142 |
| 2013/0039632 A1* | 2/2013 | Feinson | H04N 5/77 | 386/223 |
| 2013/0083168 A1* | 4/2013 | Kim | H04N 13/0239 | 348/47 |
| 2013/0120562 A1* | 5/2013 | Chang | G01B 11/03 | 348/135 |
| 2013/0188018 A1* | 7/2013 | Stevens | G06T 7/0004 | 348/46 |
| 2014/0098243 A1* | 4/2014 | Ghazizadeh | G06T 7/0018 | 348/187 |
| 2014/0118501 A1* | 5/2014 | Kim | H04N 13/0239 | 348/46 |

\* cited by examiner

CALIBRATION PLATE FOR CALIBRATING A PLURALITY OF IMAGE CAPTURING DEVICES AND METHOD FOR CALIBRATING A PLURALITY OF IMAGE CAPTURING DEVICES

CROSS-REFERENCE TO RELATED APPLICATION

This application claims the benefit of Taiwan Patent Application No. 101150501, filed on Dec. 27, 2012, which is hereby incorporated by reference for all purposes as if fully set forth herein.

BACKGROUND OF THE INVENTION

Field of Invention

The present invention relates to a calibration plate for calibrating a plurality of image capturing devices and a method for calibrating a plurality of image capturing devices, and more particularly to a calibration method that adopts calibration patterns and graphically encoded patterns having both regular arrangement and repetitiveness on a calibration plate to calibrate image contents and position relationships of a plurality of image capturing devices.

Related Art

Taiwan Patent Publication No. TW 201018882 discloses a calibration system and a calibration method, in which mainly graphs of a calibration plate at different magnifications and a matrix calibration pattern are used to calibrate image and movement platform of an image capturing device, so as to achieve precision measurement. However, this method is only applicable to the calibration of a single image and is not applicable to the calibration for a plurality of channels or a plurality of image capturing devices.

U.S. Pat. No. 5,978,081 discloses designs of a calibration graph and a calibration plate for use in semiconductor manufacturing, in which it is mainly designed that known matrix dot graph placed opposite are at all image capturing devices, and the positions, orientations and aberration definitions of image capturing devices are calibrated at the same time, thereby enhancing planar visual precision. However, a graphic area needs to be designed for image capturing positions, and therefore the application flexibility is low.

U.S. Pat. No. 6,301,396 discloses a method for calibrating the position and orientation of an image, in which mainly a feature shape of a known graph is used to recognize a orientation and a relative position of the graph, and a similar graph at a known relative position is designed for a plurality of image capturing devices, so as to obtain practical relative positions of the image capturing devices. However, the graphic design thereof is limited, the approximate positions of the image capturing devices need to be known in advance, and the problem such as distortions and aberrations of the image cannot be solved at the same time.

In the prior art, a conventional calibration plate with matrix dot pattern only can be used in the image calibration for a single image capturing device, which is already insufficient for calibrating relative positions and mechanical movement positions of multiple image capturing devices. When a position relationship between image capturing devices needs to be calibrated, an image captured by each image capturing device has to contain the graph of the entire calibration plate, which is not applicable to calibrate large-area and high-definition machine image. The earlier prior art patents have mentioned the calibration of a plurality of image capturing devices, but the design flexibility thereof is low, which is not applicable to the image capturing devices that cannot be predicted or that often need to move The conventional calibration of the image capturing devices lacks the consideration of image calibration for the whole planar space, and no longer satisfied the current fabrication processes in optoelectronics, automated assembly, and machine vision industry.

Therefore, a method for calibrating multiple image capturing devices and a calibration plate using the method need to be provided to solve the foregoing problem.

SUMMARY OF THE INVENTION

The objective of the present invention to provide the calibration of image distortions, lens aberrations, and image center positions for multiple image capturing devices, an calibration procedure for positions and orientations from the calibration pattern, and a calibration process method for establishing a global coordinate system between the multiple image capturing devices and the mechanical movement state.

To achieve the foregoing objective, the present invention provides a calibration plate including: a plate having a front face and a rear face; a plurality of calibration patterns formed at the front face of the plate, arranged in a regular manner, and used to calibrate image distortions, lens aberrations, and image center positions for the image capturing devices; and a plurality of graphically encoded patterns formed at the front face of the plate, the graphically encoded patterns being different from each other, and the graphically encoded patterns recording the position information of the calibration patterns.

To achieve the foregoing objective, the present invention further provides a method for calibrating a plurality of image capturing devices, comprising the following steps of: placing a calibration plate on a platform, wherein the calibration plate is located at observation positions of the image capturing devices; photographing a plurality of graphically encoded patterns on the calibration plate by the image capturing devices, so as to obtain a first group of coordinate data; and determining relative positions of the image capturing devices based on the first group of coordinate data, so as to calibrate information about relative positions and orientations of the image capturing devices.

To achieve the foregoing objective, the present invention further provides a method for calibrating a plurality of image capturing devices, comprising the following steps of: placing a calibration plate on a first platform, wherein the calibration plate is located at observation positions of a first group of image capturing devices; photographing a plurality of graphically encoded patterns on the calibration plate by the first group of image capturing devices, so as to obtain a first group of coordinate data; determining relative positions of the first group of image capturing devices based on the first group of coordinate data, so as to calibrate information about relative positions and orientations of the first group of image capturing devices; transferring the calibration plate to a second platform by a fixed mechanical movement, wherein the calibration plate is located at observation positions of a second group of image capturing devices; photographing a plurality of graphically encoded patterns on the calibration plate by the second group of image capturing devices, so as to obtain a second group of coordinate data; and calibrating relevant information between the first group and the second group of image capturing devices, and establishing a global coordinate system to connect with the first and second platforms based on the first group of coordinate data and the second group of coordinate data.

The calibration plate of the present invention have both of calibration patterns and graphically encoded patterns, and therefore can calibrate image distortions, lens aberrations, and image center positions for a plurality of image capturing devices, and at the same time perform an image calibration procedure for coordinate relationship of positions and orientations of a plurality of image capturing devices relative to a calibration plate.

To make the aforementioned and other objects, features and advantages of the present invention clearer, detailed illustration is provided in the following with reference to the accompanying drawings.

BRIEF DESCRIPTION OF THE DRAWINGS

The present invention will become more fully understood from the detailed description given herein below for illustration only, and thus are not limitative of the present invention, and wherein:

FIG. 2b is an enlarged view of position A in FIG. 2a;

DETAILED DESCRIPTION OF THE INVENTION

Figure 1:
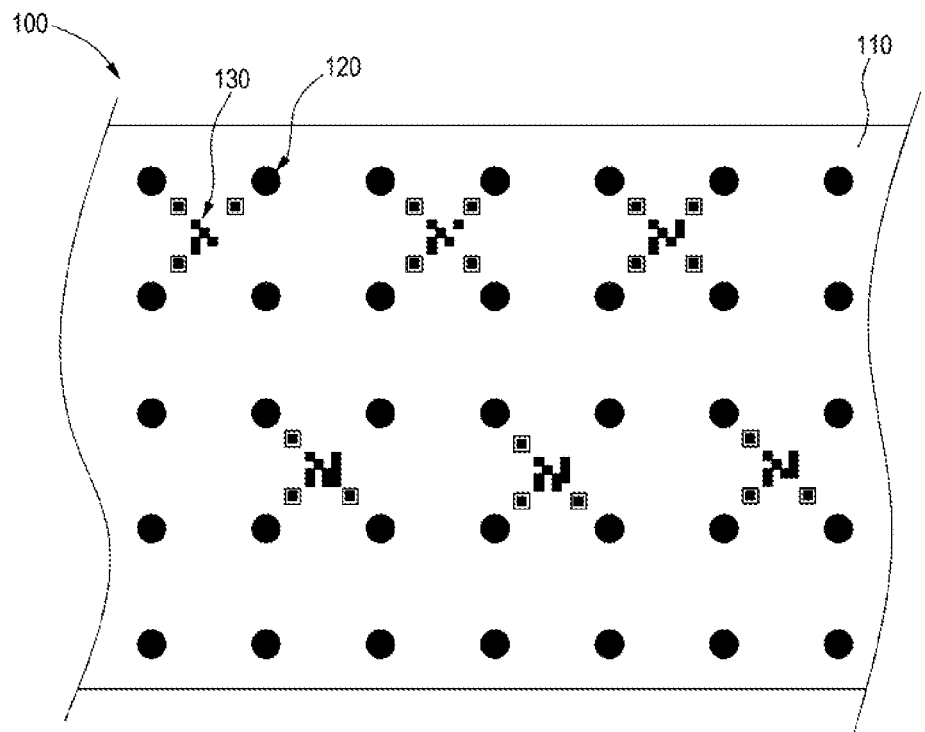
FIG. 1 is a schematic plan view of a calibration plate according to a first embodiment of the present invention.

FIG. 1 is a schematic plan view of a calibration plate according to a first embodiment of the present invention. A calibration plate 100 is configured to calibrate a plurality of image capturing devices. The calibration plate 100 includes: a plate 110, a plurality of calibration patterns 120, and a plurality of graphically encoded patterns 130. The plate 110 can be transparent or nontransparent. The calibration patterns 120 can be formed at a front face of the plate 110 through a printing or semiconductor manufacturing manner. The calibration patterns 120 can be a plurality of repetitive graphs, and the calibration patterns 120 are arranged in a regular manner. In this embodiment, the calibration patterns 120 are arranged in a matrix manner. The calibration patterns 120 are used to calibrate image distortions, lens aberrations, and image center positions of the image capturing devices. The graph of the calibration pattern 120 can be circular, rectangular or in other geometric shapes.

The graphically encoded patterns 130 can be recognized by a machine vision method, and can be formed on the front face of the plate 110 by using, but is not limited to, a printing manner. Each graphically encoded pattern 130 is adjacent to any of the calibration patterns 120. Preferably, the graphically encoded patterns 130 are located between the adjacent calibration patterns 120. The graphs of the graphically encoded patterns 130 are different from each other, the positions and orientations of the calibration patterns 120 adjacent to the graphically encoded patterns 130 can be recorded by the graphically encoded patterns 130, and subsequently the image capturing device can identify the positions and orientation of the calibration patterns 120 through the graphically encoded patterns 130.

Figure 2A:
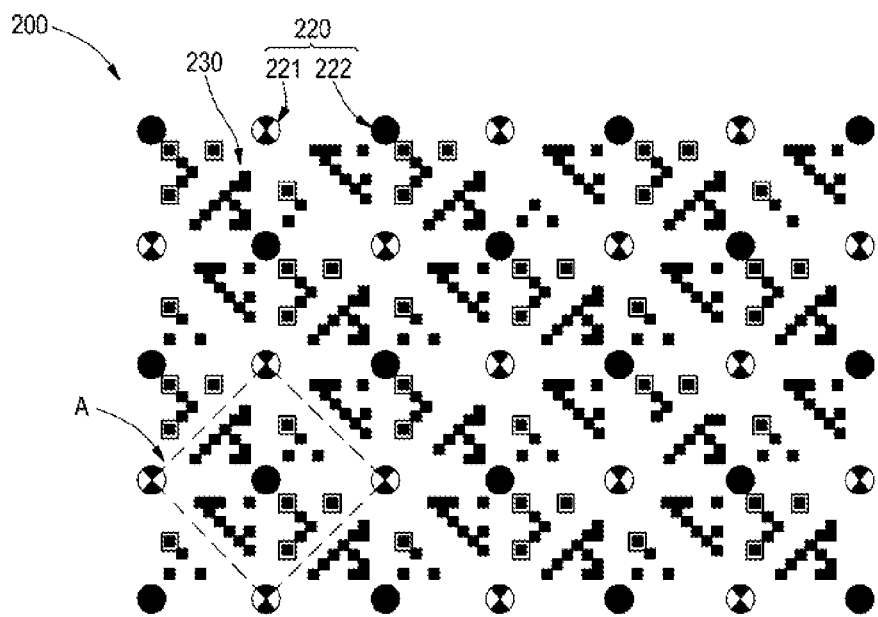
FIG. 2a is a schematic plan view of a calibration plate according to a second embodiment of the present invention.

FIG. 2a is a schematic plan view of a calibration plate according to a second embodiment of the present invention. The hollow dots 221 and the solid dots 222 of the calibration plate 200 are the calibration pattern 220, and the pattern located inside four adjacent hollow dots 221 is the graphically encoded pattern 230 of the calibration plate 200.

Figure 2B:
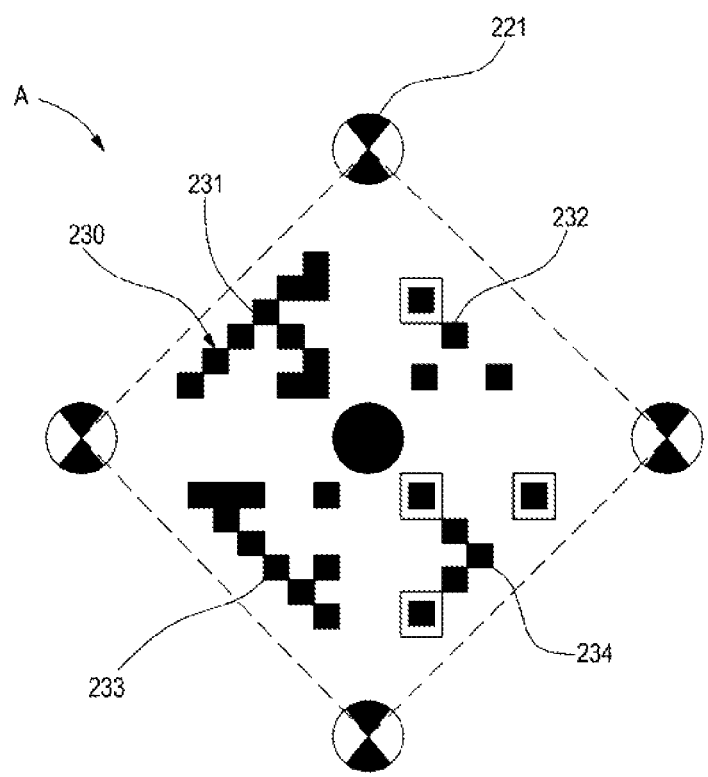
Figure 3A:
FIG. 3a to FIG. 3e are graphically encoded patterns applicable to a calibration plate of the present invention.
Figure 3B:
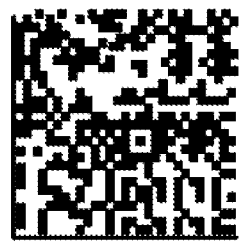
Figure 3C:
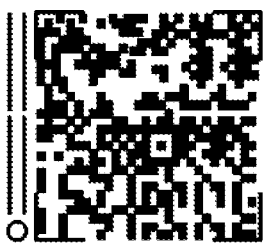
Figure 3D:
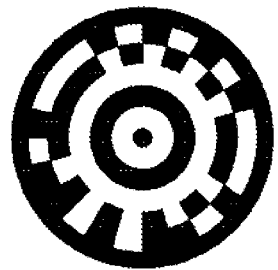
Figure 3E:
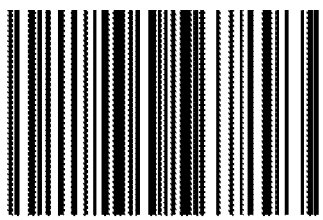

FIG. 2b is an enlarged view of position A in FIG. 2a. FIG. 2b shows four hollow dots 221 and the graphically encoded pattern 230 enclosed by four hollow dots 221. The graphically encoded pattern 230 can be further divided into a first encoded pattern 231, a second encoded pattern 232, a third encoded pattern 233, and a fourth encoded pattern 234. The first encoded pattern 231 represents the quadrant position of this point, the second encoded pattern 232 represents the horizontal axis position of this point, the third encoded pattern 233 represents the vertical axis position of this point, and the fourth encoded pattern 234 represents an extension state of this point. The extension state refers to that when the graph of the second encoded pattern 232 or the third encoded pattern 233 is insufficient to denote the positions and orientations of the calibration patterns, the fourth encoded pattern 234 is used to perform position grouping.

FIG. 3a to FIG. 3e are graphically encoded patterns applicable to a calibration plate of the present invention. The graphically encoded patterns are one-dimensional barcodes (for example, FIG. 3e), two-dimensional barcodes (for example, FIG. 3a to FIG. 3d), symbols (including numbers and text), and other recognizable graphs or a combination thereof.

Figure 4:
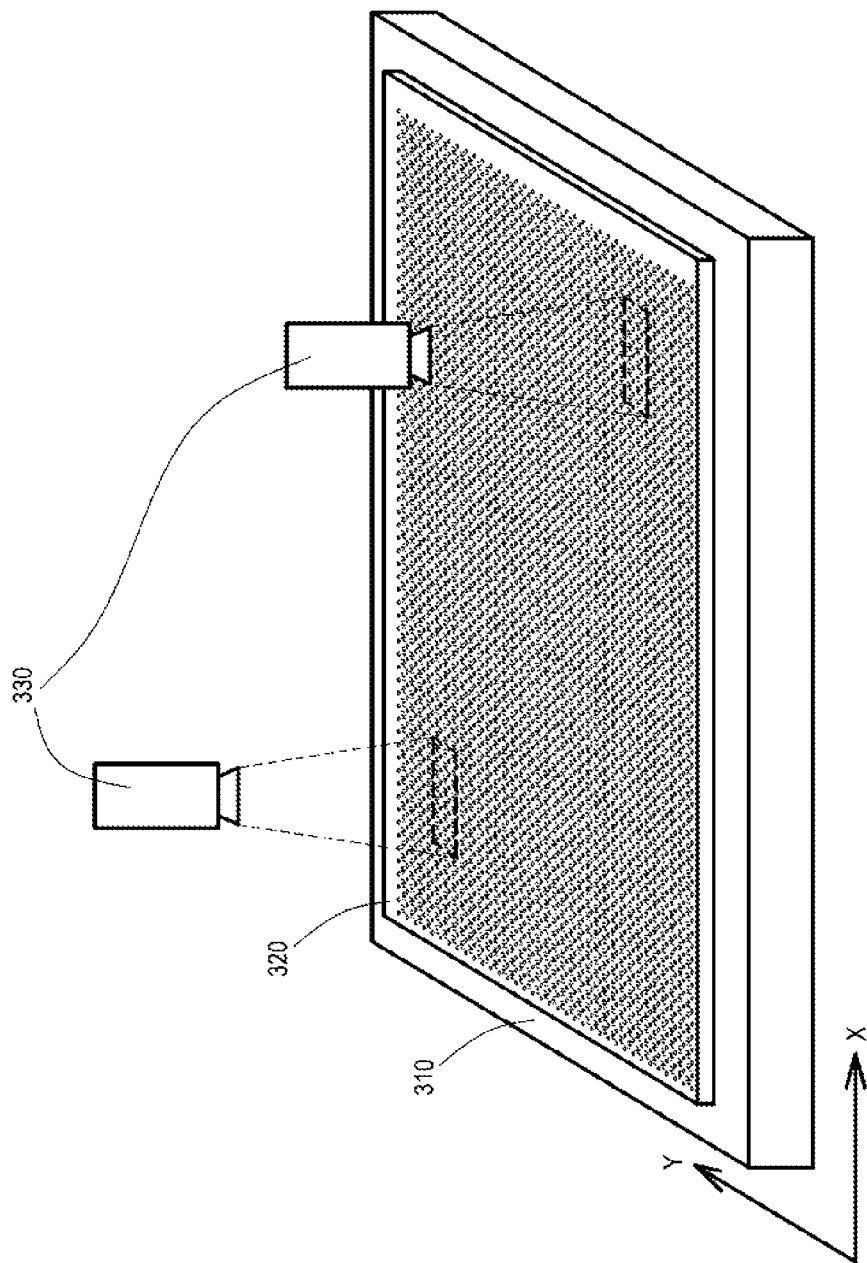
FIG. 4 is a schematic perspective view showing an application manner of the calibration plate according to the first embodiment of the present invention.

FIG. 4 is a schematic perspective view showing an application manner of the calibration plate according to the first embodiment of the present invention. For example, as shown in FIG. 4, the calibration plate may be the calibration plate 100 in FIG. 1, the calibration plate 200 in FIG. 2a or other calibration plates having different graphically encoded patterns. The calibration plate 320 in FIG. 4 is placed on a platform 310, and two image capturing devices 330 are disposed above the calibration plate 320.

Figure 5:
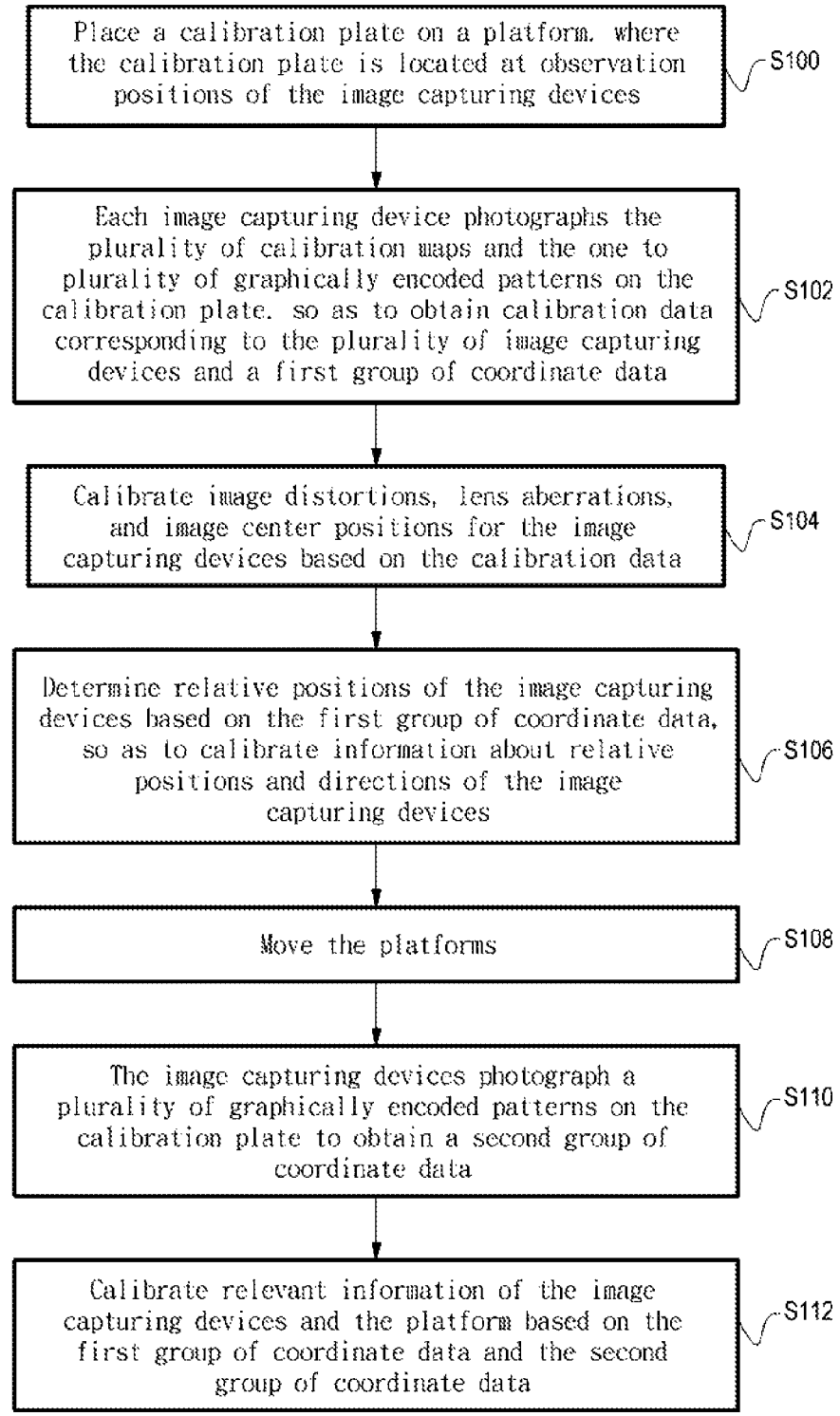
FIG. 5 is a flow chart of a method for calibrating a plurality of image capturing devices according to the first embodiment of the present invention.

FIG. 5 is a flow chart of a method for calibrating a plurality of image capturing devices according to the first embodiment of the present invention. Referring to FIGS. 4 and 5 at the same time, the method for calibrating a plurality of image capturing devices of the present invention is illustrated. The method includes the following steps:

Step S100: Place a calibration plate on a platform, where the calibration plate is located at observation positions of the image capturing devices. In this step, the calibration plate 320 is placed on the platform 310, and each image capturing device 330 can see a plurality of calibration patterns and one to a plurality of graphically encoded patterns on the calibration plate 320. Preferably, each image capturing device 330 can see nine calibration patterns and at least one graphically encoded pattern on the calibration plate 320.

Step S102: Each image capturing device photographs the plurality of calibration patterns and the one to plurality of graphically encoded patterns on the calibration plate, so as to obtain calibration data corresponding to the plurality of image capturing devices and a first group of coordinate data.

In this embodiment of the present invention, the calibration patterns photographed by the image capturing devices can be determined through the image recognition method to obtain the calibration data, the position coordinates of the calibration patterns on the calibration plate 320 photographed by the image capturing devices 330, and two position coordinates and orientations can be obtained because of the two image capturing devices 330, wherein the two position coordinates are defined as a first group of coordinate and orientation data.

Step S104: Calibrate image distortions, lens aberrations, and image center positions for the image capturing devices based on the calibration data. In this step, the image capturing devices 330 calibrate image distortions, lens aberrations, and image center positions in the photographing of the image capturing device 330 based on the calibration data.

Step S106: Determine relative positions of the image capturing devices based on the first group of coordinate data, so as to calibrate information about relative positions and orientations of the image capturing devices. In this step, in a calculation manner, the relative position of each position coordinate in the first group of coordinate data is calculated to identify the relative positions of the image capturing devices 330, and information about the relative positions and orientations of the image capturing devices 330 is calibrated based on the relative position of each position coordinate.

Step S108: Move the platform. In this step, the platform 310 is moved in the X direction or Y direction or in a rotation manner, so that the calibration plate 320 also moves with the platform 310; however, the movement range of the platform 310 is required to be inside the range where the image capturing device 330 is capable of photographing the calibration plate 320.

Step S110: The image capturing devices photograph a plurality of graphically encoded patterns on the calibration plate to obtain a second group of coordinate data. In this embodiment of the present invention, two image capturing devices 330 are provided, so that two position coordinates can be obtained, wherein the two position coordinates are define as the second group of coordinate data.

Step S112: Calibrate relevant information of the image capturing devices and the platform based on the first group of coordinate data and the second group of coordinate data. In this step, through the first group of coordinate data and the second group of coordinate data, the relative position and orientation relationship between the image capturing devices 330 and the platform 310 or the movement state of the platform 310 is calibrated.

To determine the state of the platform 310 during movement, repeat Step S110 to Step S112 to calibrate errors that occur when the image capturing devices 330 and the platform 310 are in different movement directions or at different movement distances.

In another embodiment, if image distortions, lens aberrations, and image center positions do not occur in the images photographed by the image capturing device 330 in the beginning, Step S102 and Step S106 to Step S112 are performed directly.

Figure 6A:
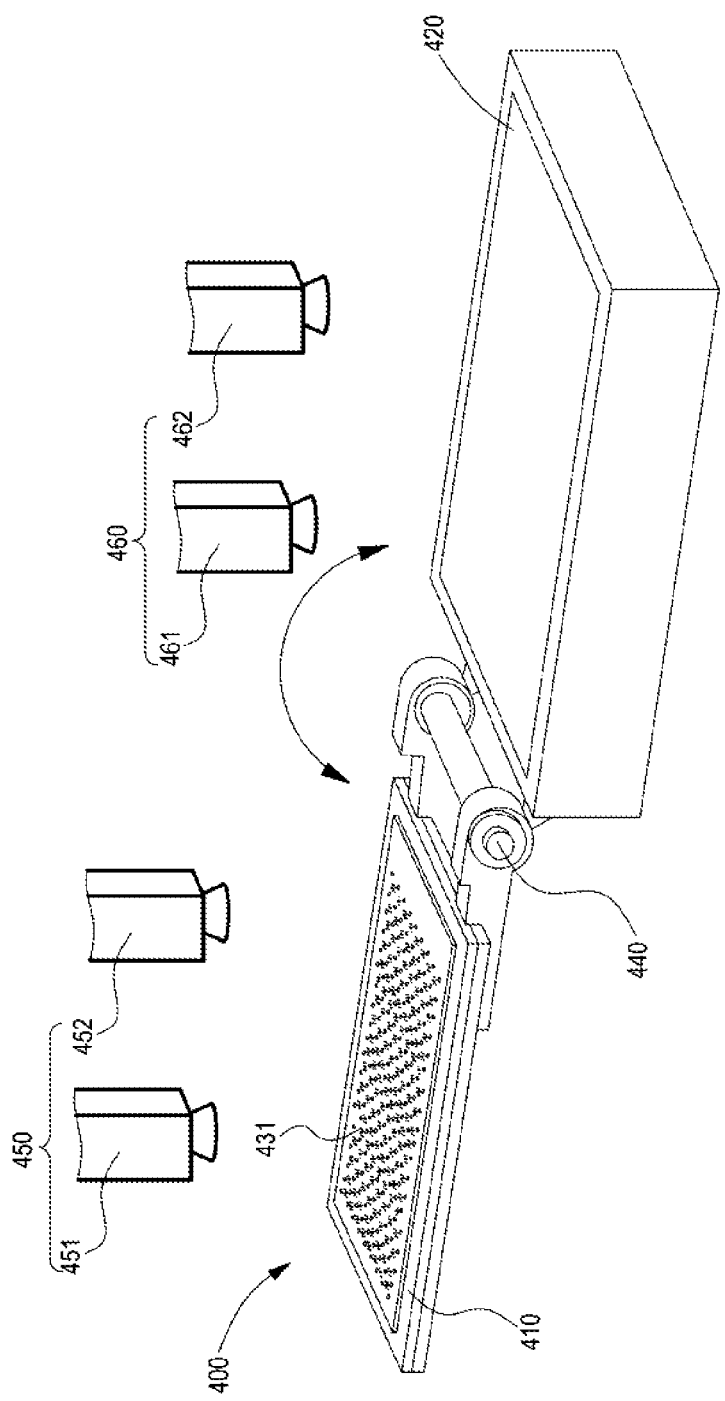
FIG. 6a and FIG. 6b are schematic perspective views showing an application manner of the calibration plate according to the second embodiment of the present invention.
Figure 6B:
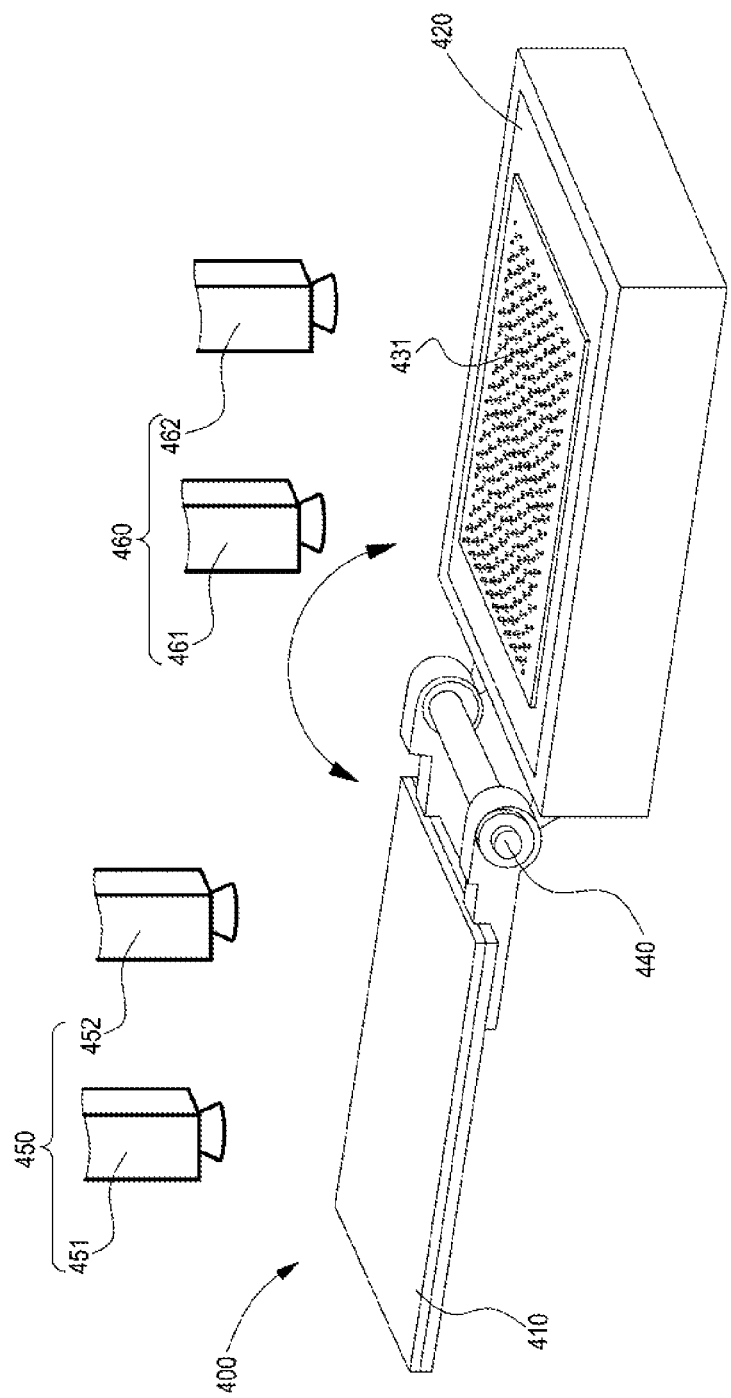

FIG. 6a and FIG. 6b are schematic perspective views showing an application manner of the calibration plate according to the second embodiment of the present invention. The device in FIG. 6a is a conventional lamination machine 400. The platform of the lamination machine 400 includes a first platform 410 and a second platform 420. The main function of the lamination machine 400 is that: for an object on the first platform 410, the first platform 410 is driven by a rotating shaft 440 to turn the object on the first platform 410 by 180 degrees, whereby the object on the first platform 410 is attached to another object on the second platform 420. Alternatively, for an object on the first platform 410, the first platform 410 is driven by the rotating shaft 440 to turn the object on the first platform 410 by 180 degrees to place the object on the first platform 410 onto the second platform 420. For both of the lamination of two objects and the movement of an object, errors need to be reduced; therefore, the calibration plate and the method for calibrating a plurality of image capturing devices of the present invention can used to reduce errors. Four image capturing devices are provided above the lamination machine 400 and are grouped into a first group of image capturing devices 450 and a second group of image capturing devices 460, the first group of image capturing devices 450 includes the first image capturing device 451 and the second image capturing device 452, and the second group of image capturing devices 460 includes the third image capturing device 461 and the fourth image capturing device 462.

Figure 7:
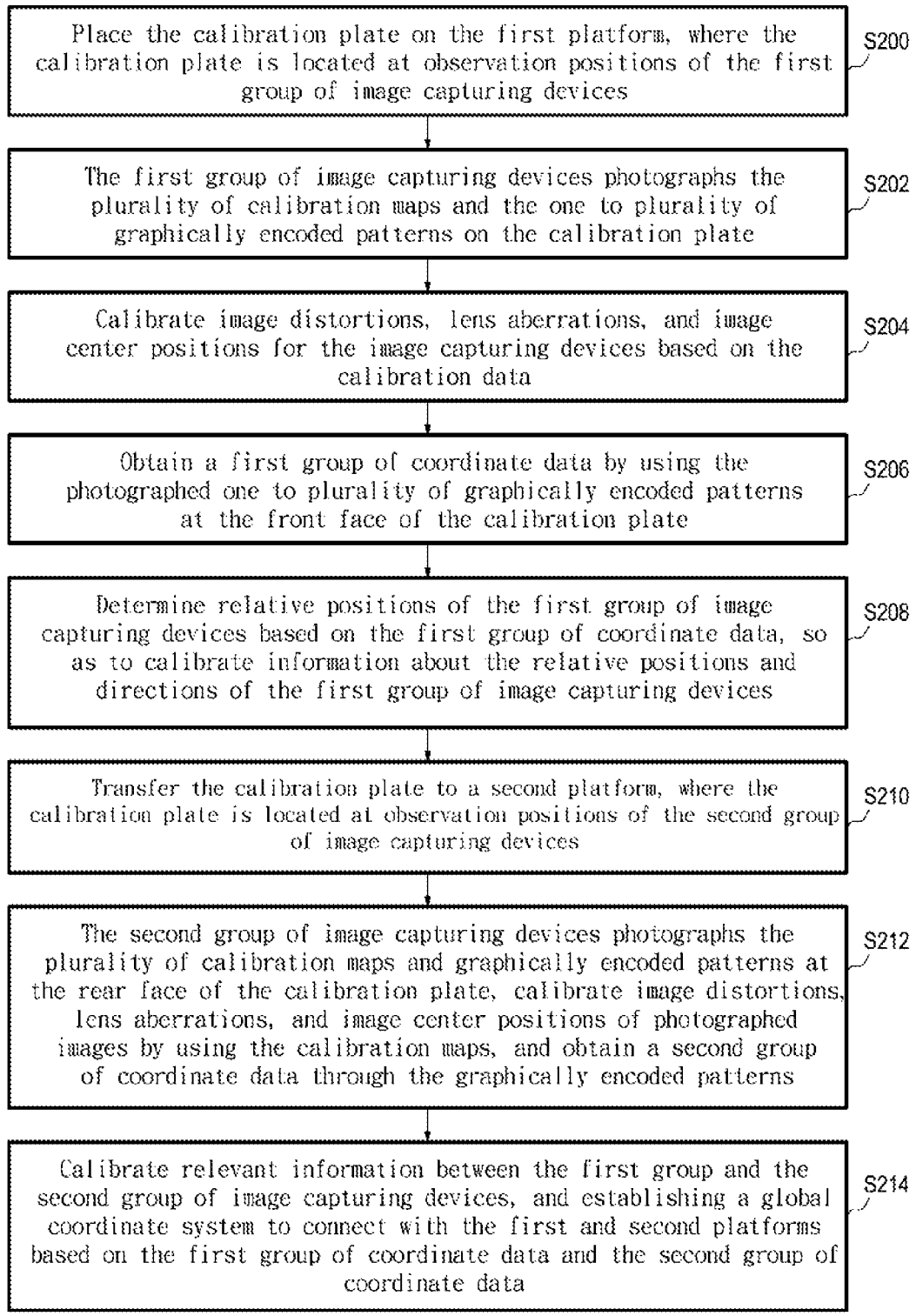
FIG. 7 is a flow chart of a method for calibrating a plurality of image capturing devices according to the second embodiment of the present invention.

FIG. 7 is a flow chart of a method for calibrating a plurality of image capturing devices according to the second embodiment of the present invention. Referring to FIGS. 6a, 6b and 7 at the same time, the application manner of the calibration plate on the lamination machine of the present invention is illustrated.

Step S200: Place the calibration plate on the first platform, where the calibration plate is located at observation positions of the first group of image capturing devices. Referring to FIG. 6a, in this embodiment of the present invention, the calibration plate 431 is placed on the first platform 410, and the first group of image capturing devices 450 can see a plurality of calibration patterns and one to a plurality of graphically encoded patterns at the front face of the calibration plate 431. Preferably, the first group of image capturing devices 450 can see nine calibration patterns and at least one graphically encoded pattern at the front face of the calibration plate 431.

Step S202: The first group of image capturing devices photographs the plurality of calibration patterns and the one to plurality of graphically encoded patterns at the front face of the calibration plate. In this embodiment of the present invention, the first group of image capturing devices 450 firstly photographs the front face of the calibration plate 431, so as to obtain calibration data and coordinate data.

Step S204: Calibrate image distortions, lens aberrations, and image center positions for the image capturing devices based on the calibration data. In this embodiment of the present invention, the first image capturing device 451 and the second image capturing device 452 calibrate image distorts, lens aberrations, and image center positions of images photographed by the first and second image capturing devices 451 and 452 based on the calibration data.

Step S206: Obtain a first group of coordinate data by using the photographed one to plurality of graphically encoded patterns at the front face of the calibration plate. In this embodiment of the present invention, the first group of image capturing devices 450 identify the position coordinates of the calibration patterns on the calibration plate 431 photographed by the first and second image capturing devices 451 and 452 through an image recognition method. Because two image capturing devices are provided, two position coordinates can be obtained, and the two position coordinates are defined as the first group of coordinate data.

Step S208: Determine relative positions of the first group of image capturing devices based on the first group of coordinate data, so as to calibrate information about the relative positions and orientations of the first group of image capturing devices. In this embodiment of the present invention, two position coordinates are calculated, the relative positions of the first image capturing device 451 and the second image capturing device 452 can then be obtained, and according to the relative position of each position coordinate, the information about relative positions and orientations of the first and second image capturing devices 451 and 452 is calibrated.

Step S210: Transfer the calibration plate to a second platform by a fixed mechanical movement, where the calibration plate is located at observation positions of the second group of image capturing devices. In this embodiment of the present invention, the first platform 410 is rotated by the rotating shaft 440, so that the calibration plate 431 on the first platform 410 turns by 180 degrees and is placed onto the second platform 420. Therefore, the second group of image capturing devices can photograph graphically encoded patterns at the rear face of the calibration plate 431.

Calibration patterns and graphically encoded patterns are provided at both of the front face and the rear face of the calibration plate 431. The calibration patterns at the rear face are also arranged in a matrix manner. The graphically encoded patterns at the rear face also record information about positions and orientations of the calibration patterns adjacent to the graphically encoded patterns. The calibration patterns and the graphically encoded patterns formed at the rear face of the plate of the calibration plate have a relative or consistent relationship with the calibration patterns and the graphically encoded patterns formed at the front face of the plate of the calibration plate. In another embodiment, the plate of the calibration plate may be made of a transparent material, and therefore as long as one face is printed with the calibration patterns and the graphically encoded patterns, the calibration patterns and graphically encoded patterns can be observed from both the front face and the rear face of the calibration plate.

Step S212: The second group of image capturing devices photographs the plurality of calibration patterns and graphically encoded patterns at the rear face of the calibration plate, calibrate image distortions, lens aberrations, and image center positions of photographed images by using the calibration patterns, and obtain a second group of coordinate data through the graphically encoded patterns. Referring to FIG. 6b, in this embodiment of the present invention, the third image capturing device 461 and the fourth image capturing device 462 photograph the plurality of graphically encoded patterns at the rear face of the calibration plate 431, and through an image recognition method, the position coordinates that the third and fourth image capturing devices 461 and 462 photograph the calibration plate 431 can be identified. Because two image capturing devices are provided, two position coordinates can be obtained, and the two position coordinates are defined as the second group of coordinate data.

Step S214: Calibrate relevant information between the first group and the second group of image capturing devices, and establishing a global coordinate system to connect with the first and second platforms based on the first group of coordinate data and the second group of coordinate data. In this step, through the first group of coordinate data and the second group of coordinate data, a global coordinate system can be established and the coordinate of each image capturing devices and platforms can be identified, errors that occur when the calibration plate 431 on the first platform 410 turns by 180 degrees and is placed on the second platform 420, or the relative position relationships among the first group of image capturing devices 450, the second group of image capturing devices 460, and the first platform 410 during turning, are calibrated.

To determine the state of the first platform 410 during turning, repeat Step S210 to Step S212 to calibrate errors that occur when the first group of image capturing devices 450, the second group of image capturing devices 460, and the calibration plate 431 turn on the first platform 420.

The aforementioned calibration plate disclosed in the second embodiment is transferred from the first platform 410 to the second platform 420 in a manner of turning by 180 degrees along the horizontal axis. However, the application of the present invention is not limited thereto. The calibration plate can be also transferred from the first platform to the second platform in a manner of translation or rotation along a vertical axis.

In conclusion, the calibration plate and the method for calibrating image capturing devices of the present invention have the following characteristics:

1. The calibration plate of the present invention have both of calibration patterns and graphically encoded patterns, and therefore can calibrate image distortions, lens aberrations, and image center positions for a plurality of image capturing devices, and at the same time perform an image calibration procedure for coordinate relationship positions and orientations of a plurality of image capturing devices relative to a calibration plate.

2. The calibration process between the platforms and the image capturing devices is simplified and the position precision of the platform and the image capturing devices after calibration is enhanced.

3. A relative relationship between a platform and image capturing devices can be provided during displacement (translation or rotation) of a platform and can be calibrated.

4. The calibration plate and the method for calibrating a plurality of image capturing devices of the present invention are applicable to industries requiring precise alignment, positioning, and assembly, such as precision microfabrication, touch panel, and IC electronic bonding, provide a high-precision positioning manner, reduce errors in control of units, and enhance the fabrication process technologies, production speed, and product yield in the industries.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A calibration plate for calibrating a plurality of image capturing devices, comprising:
  a plate, having a front face and a rear face;
  a plurality of calibration patterns, formed at the front face of the plate, and arranged in a regular manner, wherein the calibration patterns are used to calibrate image distortions, lens aberrations, and image center position for the image capturing devices; and
  a plurality of graphically encoded patterns, formed at the front face of the plate, and being different from each other, wherein the graphically encoded patterns are located dispersedly between the adjacent calibration patterns,
  wherein the calibration patterns are also formed at the rear face of the plate, the graphically encoded patterns are also formed at the rear face of the plate, and the calibration patterns and the graphically encoded patterns formed at the rear face of the plate have a relative or consistent relationship with the calibration patterns and the graphically encoded patterns formed at the front face of the plate.

2. The calibration plate according to claim 1, wherein each graphically encoded pattern is adjacent to any of the calibration patterns.

3. The calibration plate according to claim 2, wherein the graphically encoded patterns record positions and orientations of the calibration patterns adjacent to the graphically encoded patterns.

4. The calibration plate according to claim 1, wherein the graphically encoded patterns are recognizable graphs: one-dimensional barcodes, two-dimensional barcodes, digitals, text, and symbols or a combination thereof.

5. The calibration plate according to claim 1, wherein the graphically encoded patterns comprise a first encoded pattern, a second encoded pattern, and a third encoded pattern, the first encoded pattern represents a quadrant position, the second encoded pattern represents a horizontal axis position, and the third encoded pattern represents a vertical axis position.

6. The calibration plate according to claim 5, wherein the graphically encoded patterns further comprise a fourth encoded pattern, the fourth encoded pattern representing an extension state, and the extension state refers to that when graphs of the second encoded pattern or third encoded pattern are insufficient for use to denote positions and orientations of the calibration patterns on the calibration plate, the fourth encoded pattern is used to perform position grouping.

7. A method for calibrating a plurality of image capturing devices, comprising the following steps of:
    placing a calibration plate on a platform, wherein the calibration plate is located at observation positions of the image capturing devices, wherein the calibration plate comprises:
    a plate, having a front face and a rear face;
    a plurality of calibration patterns, formed at the front face of the plate, and arranged in a regular manner, wherein the calibration patterns are used to calibrate image distortions, lens aberrations, and image center position for the image capturing devices; and
    a plurality of graphically encoded patterns, formed at the front face of the plate, and being different from each other, wherein the graphically encoded patterns are located dispersedly between the adjacent calibration patterns;
    photographing a plurality of graphically encoded patterns on the calibration plate by the image capturing devices, so as to obtain a first group of coordinate data; and
    determining relative positions of the image capturing devices based on the first group of coordinate data, so as to calibrate information about relative positions and orientations of the image capturing devices.

8. The calibration method according to claim 7, further comprising the following steps of:
    photographing a plurality of calibration patterns on the calibration plate by each image capturing device, so as to obtain calibration data corresponding to the plurality of the image capturing devices; and
    calibrating image distortions, lens aberrations, and image center positions for the image capturing devices based on the calibration data.

9. The calibration method according to claim 7, wherein each image capturing device photographs nine calibration patterns on the calibration plate.

10. The calibration method according to claim 7, further comprising the following steps of:
    moving the platform;
    photographing the graphically encoded patterns on the calibration plate by the image capturing devices, so as to obtain a second group of coordinate data; and
    calibrating relevant information of the image capturing devices and the platform based on the first group of coordinate data and the second group of coordinate data.

11. The calibration method according to claim 10, wherein the relevant information of the image capturing devices and the platform comprises: relative position relationships between the image capturing devices and the platform or a movement state of the platform.

12. A method for calibrating a plurality of image capturing devices, comprising the following steps of:
    placing a calibration plate on a first platform, wherein the calibration plate is located at observation positions of a first group of image capturing devices;
    photographing a plurality of graphically encoded patterns on the calibration plate by the first group of image capturing devices, so as to obtain a first group of coordinate data;
    determining relative positions of the first group of image capturing devices based on the first group of coordinate data, so as to calibrate information about relative positions and orientations of the first group of image capturing devices;
    transferring the calibration plate to a second platform, wherein the calibration plate is located at observation positions of a second group of image capturing devices;
    photographing a plurality of graphically encoded patterns on the calibration plate by the second group of image capturing devices, so as to obtain a second group of coordinate data; and
    calibrating relevant information between the first group and the second group of image capturing devices, and establishing a global coordinate system to connect with the first and second platforms based on the first group of coordinate data and the second group of coordinate data.

13. The calibration method according to claim 12, wherein the calibration plate is transferred from the first platform to the second platform in a translation or rotation manner.

14. The calibration method according to claim 12, wherein the graphically encoded patterns on the calibration plate are photographed by the first group of image capturing devices, so as to obtain the first group of coordinate data; and the graphically encoded patterns on the calibration plate are photographed by the second group of image capturing devices, so as to obtain the second group of coordinate data.

* * * * *